United States Patent [19]

Kobayashi et al.

[11] Patent Number: 4,571,043
[45] Date of Patent: Feb. 18, 1986

[54] DUSTPROOFING DEVICE FOR THIN VERTICALLY DISPOSED CAMERA

[75] Inventors: Haruo Kobayashi, Sakai; Hiroshi Ueda, Saidaiji, both of Japan

[73] Assignee: Minolta Camera Kabushiki Kaisha, Osaka, Japan

[21] Appl. No.: 533,377

[22] Filed: Sep. 16, 1983

[30] Foreign Application Priority Data

Sep. 24, 1982 [JP] Japan .................................. 57-167407

[51] Int. Cl.⁴ .............................................. G03B 17/12
[52] U.S. Cl. ................................ 354/121; 354/195.12; 354/202
[58] Field of Search ................... 354/121, 187, 195.12, 354/202, 286, 288

[56] References Cited

U.S. PATENT DOCUMENTS

| | | | |
|---|---|---|---|
| 3,836,985 | 9/1974 | Lange | 354/287 |
| 3,938,170 | 2/1976 | Winkler et al. | 354/288 |
| 4,032,940 | 6/1977 | Chan | 354/219 |
| 4,096,506 | 6/1978 | Lange | 354/288 |
| 4,309,096 | 1/1982 | Sethi | 354/121 |

OTHER PUBLICATIONS

Beach, D. E., *Research Disclosure*, No. 16256, pp. 82, 83, Oct. 1977.
Minolta Pocket Autopack 70–Owner's Manual (date unknown).
Kodak Disc 4000 Camera–Owner's Manual (date unknown).
Kodak Disc 8000 Camera–Owner's Manual (date unknown).

*Primary Examiner*—John Gonzales
*Attorney, Agent, or Firm*—Wolder, Gross & Yavner

[57] ABSTRACT

A dustproofing mechanism for a thin, disc film cartridge type camera having windows in its front wall for the camera viewfinder and objective lens includes a cover structure guided for movement to alternative positions opening or closing both windows and an operating member accessible through one of the windows is connected to the cover structure to permit the manual selective movement of the cover structure to the window open or closed position.

13 Claims, 4 Drawing Figures

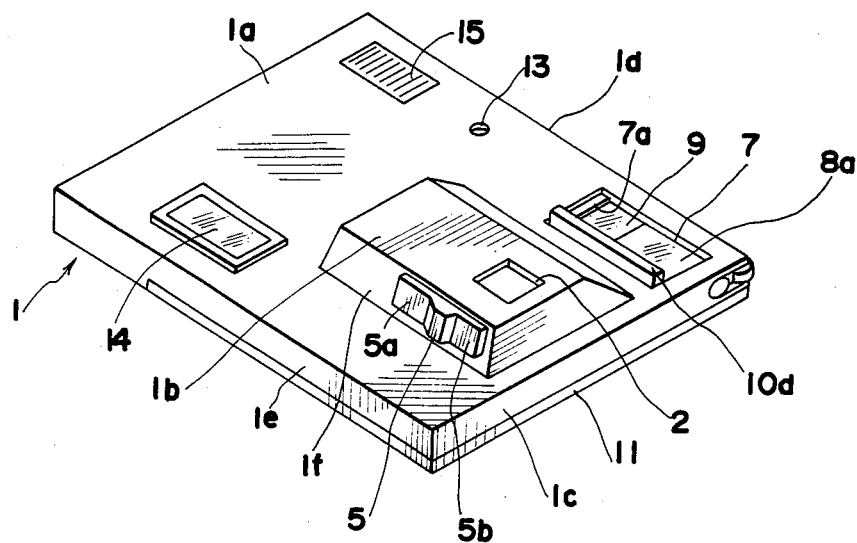
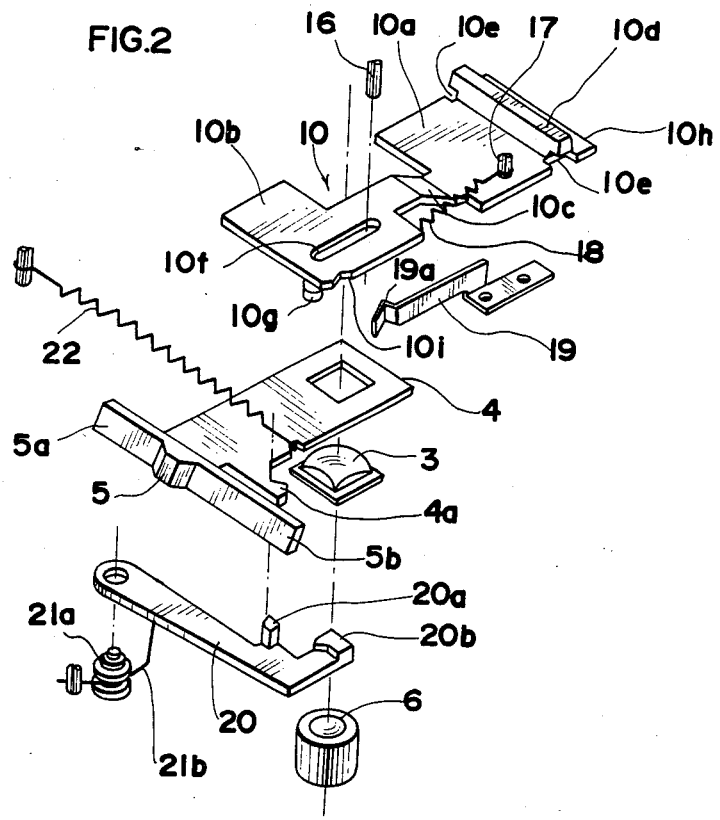

DUSTPROOFING DEVICE FOR THIN VERTICALLY DISPOSED CAMERA

BACKGROUND OF THE INVENTION

1. Field of the Invention

The present invention relates to improvements in a thin vertically disposed camera having a picture-taking lens window and a rectangular viewfinder window in the front wall of the camera housing and being virtually of rectangular parallelpiped shape thinly dimensioned in the forward and rearward direction and it relates more particularly to an improved dustproofing mechanism for covering the picture-taking lens window and the viewfinder window.

2. Description of the Prior Art

A typical example of the subject type of camera is described in U.S. Pat. No. 4,309,096 and is for use with a disc type film cartridge. Such disc film cameras have been marketed for many years. The disc film cartridge is equipped with a film disc hub near its center and may be releasably coupled to the camera film disc increment rotating system. Fifteen successive film frames are arranged about the periphery of the hub in such a manner that the shorter side of each frame is oriented in a circumferential direction. Since the aforesaid disc film cartridge is of a thin and flat construction, it is most suitable for achieving the design of a thin vertically disposed camera.

While these compact and flatly shaped cameras are handy for carrying in the photographer's pocket or bag, they possess the common disadvantage in that dirt and dust very often deposit onto the surface of the picture-taking lens and on the viewfinder optical system, while the cameras are not in use. In order to eliminate the disadvantages, a cover or lid for totally enclosing the camera housing may be employed. However, such cover may obviate the advantages afforded by the compact and flat camera configuration, thereby making it difficult to accommodate them in the photographer's pocket or bag.

Therefore, some of the aforesaid types of compact and horizontal format configured cameras being presently marketed are equipped with a plate shaped viewfinder window cover and a plate shaped picture-taking lens window cover, both of which are interconnected and installed within the camera housing. A manually slidable member connected to the viewfinder window cover and picture-taking lens cover is provided on the front wall of the camera housing. Thus, it is possible to achieve the covering of the picture-taking lens window and viewfinder window while the camera is not in use.

However, in such structure, an opening or slot for allowing the movement of a connecting portion connecting the manual slidable member to both of the viewfinder window cover and picture-taking lens cover, is provided at the front wall of the camera housing besides the picture-taking lens window and viewfinder window. Due to such opening or slot, dirt and dust may penetrate into camera housing. Consequently, additional dustproofing construction is necessary in order to keep dirt and dust out of the camera housing.

SUMMARY OF THE INVENTION

Accordingly, it is a principal object of the present invention to provide a simple and reliable dustproofing device for preventing dirt and dust from entering the picture-taking lens window and the viewfinder window of a thin vertically disposed camera.

Another object of the invention is to provide a dustproofing device for a thin vertically disposed camera, by which a photographer can optionally manipulate a cover member to cover the picture-taking lens window and the viewfinder window without installing an additional operating member for moving the cover member.

Still another objective of the invention is to provide a dustproof device for use with a highly compact and thin camera, in which a member, which serves to cover the picture-taking lens and the viewfinder lens, is prevented from being inadvertently activated.

BRIEF DESCRIPTION OF THE DRAWING

FIG. 1 is a perspective view of a thin vertically disposed camera incorporating the dustproofing device according to a preferred embodiment of the present invention;

FIG. 2 is an exploded perspective view illustrating the principal components of the dustproofing device;

DETAILED DESCRIPTION OF THE PREFERRED EMBODIMENT

Figure 3:
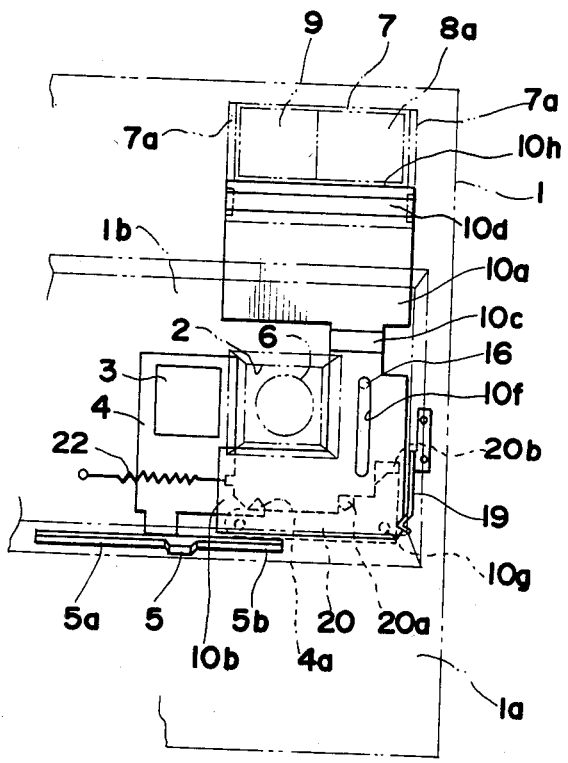
FIG. 3 is a front elevational view of the assembled dustproofing device shown in FIG. 2.

Referring now to the drawings which illustrate a preferred embodiment of the present invention, the reference numeral 1 generally designates a camera housing, which is of an approximately rectangular parallelpiped shape, relatively thin in its transverse dimension, that is in the forward and backward direction.

Housing 1 includes a portion of front wall 1a and a side wall 1c, a portion of a top wall 1d and a bottom wall 1e, and a film accommodating chamber cover 11 defining the back wall.

A forward hollow projection on ridge 1b is integrally formed on front wall 1a. A window 2 which is located in projection or ridge 1b proximate side wall 1c is the picture-taking lens window and a camera or objective lens 6 is positioned just behind the picture-taking lens window. A rectangular shaped viewfinder window 7 is located in the upper corner of front wall 1a in the proximity of side walls 1c and 1d. Behind viewfinder window 7, there is provided a viewfinder objective lens 8a which is part of a viewfinder optical system 8 and provides a visual field of rectangular shape corresponding to the exposure frames on the film member of a camera loaded disc film cartridge 12 and an illuminating window 9 for forming an illuminating type bright frame, adjoining objective lens 8a.

The viewfinder opening corresponding to objective lens 8a is of a rectangular shape with its side edges being shorter than its top and bottom edges when viewed from the front. Thus, a viewfinder field of rectangular shape is formed corresponding to the exposure frames on the film member. Reference numeral 13 designates a light receiving element window for exposure control located in front wall 1a, numeral 14 represents a shutter release button and numeral 15 represents thelight emitting portion of a flash unit incorporated in the camera housing. Located on the bottom wall 1f of projecting ridge 1b is an operating member 5 for close-up photography lens transfer.

Figure 4:
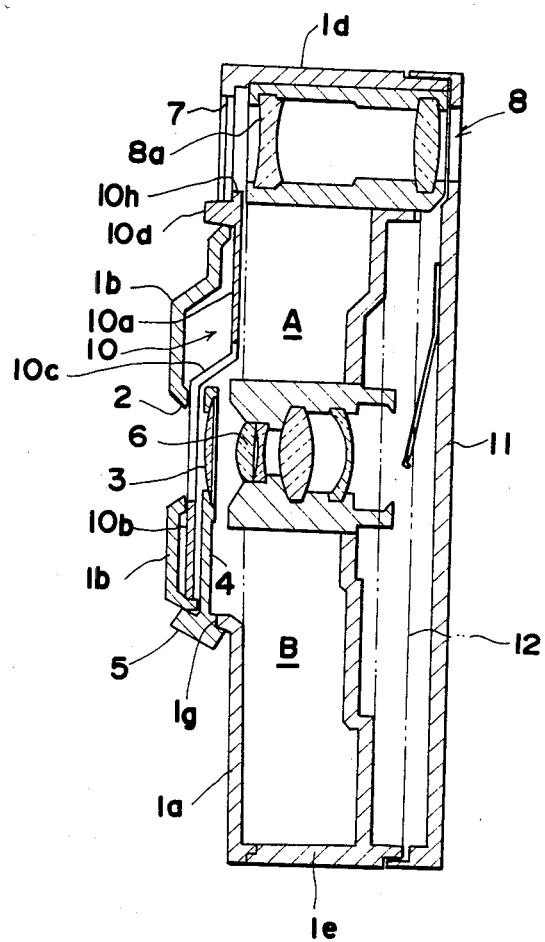
FIG. 4 is a transverse vertical cross sectional view of the thin vertically disposed camera incorporating the improved dustproofing device shown in FIGS. 2 and 3.

As shown in FIG. 4, a shield or cover member 10 is in the rear of projecting ridge 1b. Cover member 10 is an integral unit consisting of a plate shaped viewfinder window cover 10a, located between objective lens 8a of a viewfinder optical system 8, and viewfinder window 7, a plate shaped picture-taking lens window cover 10b located between picture-taking lens 6 and a picture-taking lens window 2, and a coupling portion 10c which connects the two cover sections.

A manipulating projection or finger piece 10d is integrally formed with and projects forwardly from viewfinder cover section 10a. Manipulating projection 10d is parallel to the longer edge of the viewfinder opening of viewfinder window 7. Grooves 10e are formed in the rear face of and between both ends of the manipulating projection and the surface of viewfinder window cover member 10a. Rib portions 7a formed at both shorter edges of viewfinder window 7 slidably engage the grooves 10e. Also, picture-taking lens window cover section 10b is provided with a vertical elongated slot 10f extending almost parallel to the shorter edges of the viewfinder opening of the viewfinder window 7 and elongated slot 10f is located at a position in which would at no time overlap picture-taking lens window 2. A pin 16, protruding rearwardly from the rear surface of projecting ridge 1b slidably engages elongated slot 10f.

Therefore, shield or cover member 10 is vertically linearly movable by the guidance of rib portion 7a and pin 16 in upward and downward directions substantially parallel to the shorter edges of the viewfinder opening of the viewfinder window 7. The guiding means of cover member 10 comprise rib portion 7a, pin 16, slot 10e, and elongated groove 10f.

Furthermore, cover member 10 is provided with a pin 10g on the back of picture-taking lens window cover section 10b and is biased upwardly by a spring 18 connected between pin 10g and a fixed pin 17 projecting rearwardly from the back of projecting ridge 1b. When the cover member 10 is displaced until its top end 10h abuts the upper, longer edge of viewfinder window 7, viewfinder window 7, and picture-taking lens window 2 are shielded or covered by viewfinder window cover section 10a, and picture-taking lens window cover 10b, respectively. These positions define the closed shielding or screening positions of viewfinder window cover section 10a and picture-taking lens cover section 10b. Cover member 10 is provided with a notch 10i at the side edge of picture-taking lens window cover section 10b so that a pawl portion 19a of leaf spring 19 which is a restraining means for releasably locking cover member 10, fits into said notch 10i. When pawl portion 19a engages notch 10i, cover member 10 is held against the influence of spring 18. At this time, viewfinder window cover section 10a, and picture-taking lens window cover section 10b are set in open positions retracted in from viewfinder window 7 and picture-taking lens window 2 respectively, thereby opening the two windows. In other words, the position where pawl portion 19a of leaf spring engages notch 10i is defined as the open position for viewfinder window cover section 10a and picture-taking lens window cover section 10b (refer to FIG. 3).

A support plate 4 supporting close-up lens 3 is located at the back of cover member 10. Lens support plate 4 is connected to the operating member 5, and is guided by the laterally elongated slot 1g formed in bottom wall 1f of projecting ridge 1b so as to be movable in both left and right directions. The elongated slot 1g is always shielded by masking extension sections 5a and 5b of the operating member 5 irrespective of the position of lens support plate 4. A lever 20, which is pivotally supported by a pin 21a, is a lock lever for releasably locking lens support plate 4 at its close-up position when the close-up lens 3 is brought into alignment with picture-taking lens 6 along the optical axis. Further, lever 20 is provided with a projection 20a which engages projection 4a of the lens support plate 4. Lever 20 is biased in the direction in which both projections 4a and 20a mutually engage each other, namely, in the clockwise direction. Also, lock lever 20 is provided with another projection 20b which engages pin 10g of cover member 10 and lever 20 is rotated in a counterclockwise direction by the engagement of pin 10g with projection 20b when cover member 10 moves in the upward direction. However, pin 10g and projection 20b remain separated when cover member 10 is retained in its open position by the engagement of notch 10i with pawl portion 19a of leaf spring 19. A spring 22 biases support plate 4 to automatically retract lens support plate 4 from the close-up photographing position when lens support plate 4 has been released from the retention by lock lever 20. The camera shutter mechanism, exposure control mechanism, driving system for rotating the film member, and a capacitor for the flash system, etc., are arranged in the spaces of A and B shown in FIG. 4.

Considering now the operation of the above described preferred embodiment, FIG. 3 shows the condition in which viewfinder window cover section 10a and picture-taking lens window cover section 10b are located at their respective open positions and lens holding plate 4 is retracted from its close-up photographing position wherein normal photography can be effected by viewing the subject through the viewfinder and using only picture-taking lens 6.

In order to store the camera in the photographer's pocket or bag after shooting, manipulating projection 10d is lightly pushed in the upward direction so that pawl portion 19a of leaf spring 19 is displaced from notch 10i, whereupon spring 18 urges cover member 10 to move in the upward direction guided by rib portion 7a and pin 16 causing viewfinder window 7, and picture-taking lens window 2 to be shielded by viewfinder window cover section 10a and picture-taking lens cover window section 10b, respectively. This condition minimizes or eliminates the possibility of dirt and dust entering the interior of camera housing 1 through viewfinder window 7 and picture-taking lens window 2. It will also be noted that although elongated slot 1g is provided for allowing the sliding movement of the operating member 5 in the above embodiment, the elongated slot is also shielded by shield extension sections 5a and 5b of operating member 5 thereby eliminating the possibility of dirt and dust entering the interior of the camera housing through elongated slot 1g.

In order to perform close-up photography, operating member 5 is shifted to the right as viewed in FIG. 3, and lens support plate 4 is thus shifted to the close-up photographing position against the influence of spring 22. Consequently, projection 20a of lock level 20 engages projections 4a resulting in the retention of lens support plate 4 in its close-up photographing position thereby permitting close-up photography by close-up lens 3 and picture-taking lens 6, the subject being viewed through the viewfinder.

To return the camera to its normal photographing condition from the close-up photographing condition, the operating member 5 is manually shifted to the left. As a consequence, projection 4a depresses projection 20a causing lock lever 20 to rotate in a counterclockwise direction against the influence of spring 21b, resulting in the disengagement of both projections 4a and 20a, and the automatic retraction of lens support plate 4 and operating member 5 by the force of spring 22 from the position of close-up photography. It will be noted that the engaging surfaces of projections 4a and 20a are so inclined or cammed so as to permit easy disengagement between projections 4a and 20a.

Moreover, when it is desired to interrupt closeup photography, operating member 5 need not be manually shifted for moving it to the left. On the contrary, the upward depression of manipulating projection 10d is the only operating required.

When cover member 10 moves upwardly under the influence of spring 18, pin 10g engages projection 20b, causing lock lever 20 to rotate in a counterclockwise direction against the influence of spring 21b, resulting in the disengagement of projection 4a and the automatic movement of lens holding plate 4 from the position of close-up photography.

When resumption of photography is desired, manipulating projection 10d is downwardly depressed until cover member 10 has reached the position where pawl portion 19a of the leaf spring engages notch 10i.

If the photographer has forgotten to downwardly move the projection 10d, when he looks through the viewfinder he immediately learns that the viewfinder window is still covered by the viewfinder window cover and the camera is not ready for photographing. In such case, the photographer may erroneously operate the operating member 5 instead of manipulating projection 10d in order to open the windows of the viewfinder and the picture-taking lens, thus resulting in missing a precious shutter opportunity. However, with the structure of the present embodiment, such erroneous operation is effectively avoided if the photographer is simply aware of the proper operating direction of manipulating projection 10d since the operating directions of operating member 5 and manipulating projection 10d are quite different from each other.

In the embodiment described above, the dustproofing device included a manipulating projection 10d protruding from the viewfinder window 7, and therefore, it is not necessary to provide an extra opening or slot on the front wall 1a for manipulating cover member 10 from outside the camera housing. Consequently, while the conventional type of camera requires an extra opening or slot for enabling the manual operation of the cover member and also requires an extra dust proof mechanism for covering or shielding the opening, the camera using the structure of the present invention does not require such extra opening and mechanism, the design allowing a simple and reliable device construction. Another advantage of the present improved structure is that less space is required inside the camera housing 1 for insuring the proper movement of cover member 10 since the cover member moves upward and downward almost parallel to the viewfinder window 7 and along the shorter side edges of the viewfinder opening. This could result in a greater degree of freedom for the arrangement of other camera mechanisms in the space behind the front wall 1a including spaces A and B.

Still another advantage is that even when erroneously applying a force to manipulating projection 10d for moving it in the rearward direction (to the inner side of camera housing 1), it is entirely unlikely that objective lens 8 will be damaged or impaired by cover section 10a since viewfinder window cover section 10a is supported by ridge section 7a.

While there has been described and illustrated a preferred embodiment of the present invention, it is apparent that numerous alterations, additions and omissions may be made without departing from the spirit thereof. For instance, manipulating projection 10d may be formed integrally with picture-taking lens window cover section 10b so that it protrudes from picture-taking lens window 2 to the outside of front wall 1a. Also, viewfinder window cover section 10a, picture-taking lens window cover section 10b, and coupling section 10c, may be formed individually so that both cover sections 10a and 10b are mutually coupled through coupling section 10c. Also, when the size of picture-taking lens window 2 differs from that of viewfinder window 7, the ratio between the moving distance of viewfinder window cover section and that of picture-taking lens window cover section may be altered by the coupling section. Further, when no light receiving section for forming the bright frame is required or when the light receiving section is located separate from the viewfinder opening section, viewfinder window 7 is formed only corresponding to the viewfinder opening section.

As explained above, the dustproofing device embodying the present invention is designed to be provided with the operating member for manipulating the viewfinder window cover section and picture-taking lens window cover section so that the operating member protrudes either from the viewfinder window or from the picture-taking lens window, per se. This results in no extra opening being required on the front wall of the camera housing for permitting the movement of the operating member. Thus, with a simple and rational device configuration, it is possible to prevent dirt and dust entering the inside of the camera housing through the viewfinder window and picture-taking lens window when the camera is not in use.

What is claimed is:
1. In a thin vertically disposed camera including:
a body having a pair of parallel longer edges, a pair of parallel shorter edges, and a front wall delineated by said body longer and shorter edges, said front wall having a first window delineated by a pair of longer edges parallel to said body longer edges and a pair of shorter edges parallel to said body shorter edges;
a protruding portion formed on and protruding from said front wall and having a second window therein;
a picture-taking lens located in said body and accommodated by said protruding portion and having an optical axis traversing said second window perpendicular to said front wall; and
a viewfinder optical system having an optical axis transversing said first window perpendicular to said front wall,
an improved dustproofing mechanism comprising:
a first cover member located between said first window and said viewfinder optical system;
a second cover member located between said second window and said picture-taking lens;

means connecting said first and second cover members;

support means movably supporting said first and second cover members for movement in a direction parallel to said body shorter edges between an opened position opening said windows and a closed position closing said windows; and a manually operable projection provided on said first cover member and protruding through said first window.

2. An improved dustproofing mechanism as set forth in claim 1, wherein said first cover member, second cover member and connecting means are unitary member.

3. An improved dustproofing mechanism as set forth in claim 2 further comprising means for urging said first and second cover members toward said closed positions and lock means for releasably locking said first and second cover members in their open positions against said urging means.

4. An improved dustproofing mechanism as set forth in claim 3 wherein said manually operable projection includes a ridge provided on said first cover member and protruding from said first window and running along said longer edge of the first window and wherein said support means includes ribs integrally provided on said pair of parallel shorter edges of the window and wherein said first cover member has a pair of grooves positioned between said ridge and itself for receiving said pair of ribs.

5. A camera usable with a disc type film cartridge, said camera comprising;

a camera housing of substantially thin parallelpiped configuration and including front and rear walls, the areas of which are wider than the other housing walls;

a viewfinder optical system located in said camera housing and having an optical axis perpendicular to said front wall;

a picture-taking lens located in said camera housing, said picture-taking lens having an optical axis parallel to said viewfinder optical axis and perpendicular to said front wall, said front wall having a viewfinder window for said viewfinder optical system and a picture-taking lens window for said picture-taking lens;

a manually operable cover means movable between an open position for opening said viewfinder window and picture-taking lens window and a closed position for closing said viewfinder window and picture-taking lens window;

an auxiliary lens movable between a retracted position displaced from said picture-taking lens optical axis and an advanced position coaxial with said picture-taking lens optical axis;

a manually operable member connected to said auxiliary lens for moving said auxiliary lens between said retracted and advanced positions, said manually operable member being supported by said front wall so as to be movable in a direction which crosses the direction along which said cover means is moved;

urging means for urging said auxiliary lens from its advanced to retracted position; and retaining means for releasably retaining said auxiliary lens at said advanced position against said urging means when said auxiliary lens is moved to said advanced position, so that said auxiliary lens is released from said retaining means when said manually operable member is operated in a direction for moving said auxiliary lens from its advanced position to its retracted position.

6. A camera as set forth in claim 5, wherein said cover means includes a manually operable projection protruding out of said camera housing through said viewfinder window and wherein said front wall has an expanded portion projecting from said front wall for housing therein said auxiliary lens, said expanded portion having in its front wall said picture-taking lens window and wherein said manually operable member is supported by a side wall of said expanded portion.

7. A camera as set forth in claim 6 further comprising means for disabling the retainment by said retaining means in response to the movement of said cover means from its open to closed position.

8. A camera as set forth in claim 5, wherein said retaining means comprises first and second engaging members including click portions respectively, said click portions being releasably engaged with each other when said auxiliary lens is in its advanced position.

9. In a thin camera including a housing having a relatively large vertical front wall with a protruding portion, a rectangular viewfinder window with its short edges vertical and a picture lens window formed in said protruding portion, a viewfinder optical system located in the housing in axial registry with the viewfinder window, and a picture lens located in the housing in axial registry with the picture lens window, the improvement comprising a dustproofing mechanism, including a viewfinder shield located between said viewfinder optical system and a viewfinder window and vertically linearly movable between a closed position in closing registry with said viewfinder window and an open position offset from said viewfinder window, a picture lens shield located between said picture lens and picture lens window and vertically linearly movable with the movement of said viewfinder shield between a closed position in closing registry with said picture lens window and an open position offset from said picture lens window and a finger piece including a longitudinal ridge horizontally located on said viewfinder shield and projecting through said viewfinder window to facilitate the concurrent manual shifting of said shields between their opened and closed positions.

10. The dustproofing mechanism of claim 9 including a coupling section integrally interconnecting said shields to form a shield unit.

11. The dustproofing mechanism of claim 9, including means supporting and restricting said shields to said linear movement between their open and closed positions.

12. The dustproofing mechanism of claim 11 wherein said finger piece comprises a forwardly projecting rib located on and extending horizontally across said respective shields.

13. The dustproofing mechanism of claim 9 comprising spring means biasing said shields to their closed positions and means releasably retaining said shields in their open positions.

* * * * *